(12) United States Patent
Niewiadomski et al.

(10) Patent No.: US 11,164,457 B2
(45) Date of Patent: Nov. 2, 2021

(54) VEHICLE CONTROL SYSTEM

(71) Applicant: Ford Global Technologies, LLC, Dearborn, MI (US)

(72) Inventors: Luke Niewiadomski, Dearborn, MI (US); Hamid M. Golgiri, Westland, MI (US); Lihui Chen, Rochester, MI (US); George Edmund Walley, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 16/800,259

(22) Filed: Feb. 25, 2020

(65) Prior Publication Data

US 2021/0264785 A1    Aug. 26, 2021

(51) Int. Cl.

| G08G 1/14 | (2006.01) |
|---|---|
| B60W 50/10 | (2012.01) |
| H04L 29/08 | (2006.01) |
| G06K 9/00 | (2006.01) |
| G05D 1/00 | (2006.01) |
| B60W 50/00 | (2006.01) |

(52) U.S. Cl.
CPC ............. *G08G 1/143* (2013.01); *B60W 50/10* (2013.01); *G06K 9/00812* (2013.01); *G08G 1/149* (2013.01); *H04L 67/12* (2013.01); *B60W 2050/0075* (2013.01); *B60W 2420/42* (2013.01); *B60W 2540/215* (2020.02); *B60W 2556/45* (2020.02); *G05D 1/0088* (2013.01); *G08G 1/14* (2013.01); *G08G 1/141* (2013.01); *G08G 1/144* (2013.01)

(58) Field of Classification Search
CPC ........ G08G 1/143; G08G 1/149; G08G 1/141; G08G 1/14; G08G 1/144; G06K 9/00812; H04L 67/12; B60W 50/10; B60W 2420/42; B60W 2540/215; B60W 2556/45; B60W 2050/0077; G05D 1/0088
See application file for complete search history.

(56) References Cited

U.S. PATENT DOCUMENTS

| 7,271,738 B2* | 9/2007 | Berstis ................... G08G 1/14 340/904 |
| 7,893,847 B2* | 2/2011 | Shanbhag ............... G08G 1/14 340/932.2 |
| 8,816,879 B2* | 8/2014 | Stefik et al. ............ G08G 1/14 340/932.2 |

(Continued)

FOREIGN PATENT DOCUMENTS

EP    3144207 A1    3/2017

*Primary Examiner* — Dale W Hilgendorf
(74) *Attorney, Agent, or Firm* — Frank A. MacKenzie; Bejin Bieneman PLC

(57) ABSTRACT

Image data is obtained about an area that includes a plurality of sub-areas. One of the sub-areas is selected as a destination sub-area based on the destination sub-area being unoccupied. Then, upon detecting a candidate marker for the destination sub-area, the image data including the candidate marker is provided to a remote computer. A vehicle is operated to a stop in the destination sub-area. Then, upon receiving a message from the remote computer specifying an availability of the destination sub-area based at least on the image data, the vehicle is maintained in the destination sub-area or the vehicle is operated out of the destination sub-area.

18 Claims, 8 Drawing Sheets

(56) References Cited

U.S. PATENT DOCUMENTS

| | | | |
|---|---|---|---|
| 9,557,741 B1* | 1/2017 | Elie | G08G 1/141 |
| 9,761,139 B2* | 9/2017 | Acker, Jr. | G08G 1/144 |
| 10,423,162 B2 | 9/2019 | Yalla et al. | |
| 2015/0138001 A1* | 5/2015 | Davies | G08G 1/149 |
| | | | 340/932.2 |
| 2016/0098929 A1* | 4/2016 | Nakhjavani | G06Q 30/0241 |
| | | | 340/932.2 |
| 2016/0180712 A1* | 6/2016 | Rosen | G01C 21/36 |
| | | | 705/5 |
| 2016/0267794 A1* | 9/2016 | Cogill | G08G 1/149 |
| 2017/0132482 A1* | 5/2017 | Kim | G08G 1/168 |
| 2017/0267233 A1* | 9/2017 | Minster | B62D 15/02 |
| 2017/0355307 A1* | 12/2017 | Ha | G08G 1/168 |
| 2018/0215374 A1* | 8/2018 | Lee | G08G 1/143 |
| 2018/0321685 A1* | 11/2018 | La | G05D 1/0274 |
| 2018/0357900 A1* | 12/2018 | Wang | G06Q 20/127 |
| 2019/0371175 A1* | 12/2019 | Joos | G08G 1/144 |
| 2019/0375397 A1* | 12/2019 | Bae | G08G 1/146 |
| 2020/0307554 A1* | 10/2020 | Lai | G08G 1/143 |
| 2020/0355515 A1* | 11/2020 | Saxena | G06K 9/00637 |
| 2021/0182580 A1* | 6/2021 | Munte | G06Q 30/0635 |

* cited by examiner

VEHICLE CONTROL SYSTEM

BACKGROUND

Various sensors can provide data to identify objects in a physical, i.e., real-world, environment around a vehicle. For example, sensors such as video cameras, lidar, radar, ultrasonic sensors, etc. can provide data to identify an object. A vehicle computer can receive the data from the sensors while operating a vehicle in the environment. However, processing data from such sensors can be computationally expensive for the vehicle computer, i.e., can consume relatively large amounts of valuable processor cycles and/or memory.

DETAILED DESCRIPTION

Figure 1:
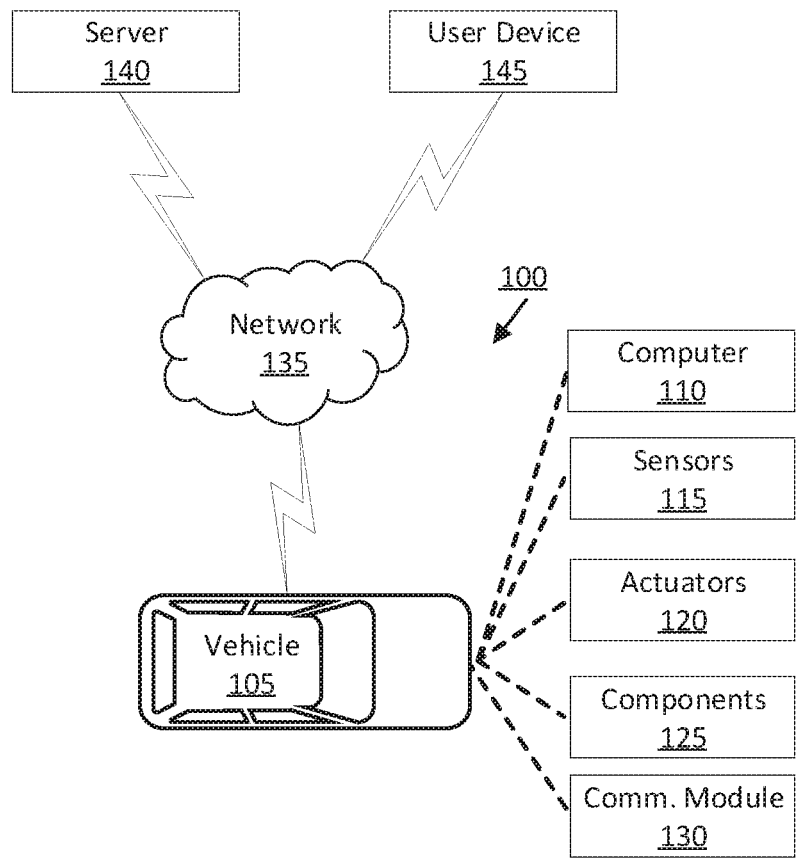
FIG. 1 is a block diagram illustrating an example vehicle control system for a vehicle.

A system includes a computer including a processor and a memory, the memory storing instructions executable by the processor to obtain image data about an area that includes a plurality of sub-areas. The instructions further include instructions to select one of the sub-areas as a destination sub-area based on the destination sub-area being unoccupied. The instructions further include instructions to then, upon detecting a candidate marker for the destination sub-area, provide image data including the candidate marker to a remote computer. The instructions further include instructions to operate a vehicle to a stop in the destination sub-area. The instructions further include instructions to then, upon receiving a message from the remote computer specifying an availability of the destination sub-area based on at least the image data, one of (a) maintain the vehicle in the destination sub-area or (b) operate the vehicle out of the destination sub-area based on the message.

The instructions can further include instructions to provide location data of the destination sub-area to the remote computer.

The instructions can further include instructions to, upon operating the vehicle to the stop, provide second image data including the candidate marker to the remote computer, wherein the message specifies the availability of the destination sub-area based further on the second image data.

The instructions can further include instructions to update the availability of the destination sub-area in a map based on the message from the remote computer specifying the destination sub-area is unavailable.

The remote computer can include a second processor and a second memory, the second memory storing instructions executable by the second processor to determine a verification of the candidate marker by determining the image data (a) includes a verified marker, or (b) does not include a verified marker. The instructions can further include instructions to at least one of identify the candidate marker or determine the candidate marker is unidentified. The instructions can further include instructions to then determine the availability based on one of the candidate marker or a validation message from a user device.

The instructions can further include instructions to, upon determining the candidate marker is unidentified, provide image data including the candidate marker to the user device.

The instructions can further include instructions to crop the image data based on the marker and a display of the user device.

The instructions can further include instructions to determine the sub-area is available based on determining the candidate marker is unverified.

The instructions can further include instructions to provide location data of the sub-area to the user device.

The instructions can further include instructions to determine the destination sub-area is available based on passage of a predetermined time without receiving the validation message from the user device.

The instructions can further include instructions to input image data indicating the candidate marker into a machine learning program and to obtain the verification of the candidate marker as output from the machine learning program.

The instructions can further include instructions to obtain an identification of the candidate marker and a confidence estimate as output from the machine learning program.

The instructions can further include instructions to determine the candidate marker is unidentified based on the confidence estimate being below a threshold.

The instructions can further include instructions to train the machine learning program based on messages from a plurality of user devices indicating the destination sub-area is unavailable within a predetermined time.

The instructions can further include instructions to update the availability of the sub-area in a map based on crowd-sourced data including messages from a plurality of user devices indicating the destination sub-area is unavailable.

A method includes obtaining image data about an area that includes a plurality of sub-areas. The method further includes selecting one of the sub-areas as a destination sub-area based on the destination sub-area being unoccupied. The method further includes then, upon detecting a candidate marker for the destination sub-area, providing image data including the candidate marker to a remote computer. The method further includes operating a vehicle to a stop in the destination sub-area. The method further includes then, upon receiving a message from the remote computer specifying an availability of the destination sub-area based on at least the image data, one of (a) maintaining the vehicle in the destination sub-area or (b) operating the vehicle out of the destination sub-area based on the message.

The method can further include providing location data of the destination sub-area to the remote computer.

The method can further include determining a verification of the candidate marker by determining the image data (a) includes a verified marker, or (b) does not include a verified marker. The method can further include at least one of identifying the candidate marker or determining the candidate marker is unidentified. The method can further include then determining the availability based on one of the candidate marker or a validation message from a user device.

The method can further include determining the sub-area is available based on determining the identified marker is unverified.

The method can further include determining the destination sub-area is available based on passage of a predetermined time without receiving the validation message from the user device.

Further disclosed herein is a computing device programmed to execute any of the above method steps. Yet further disclosed herein is a computer program product, including a computer readable medium storing instructions executable by a computer processor, to execute an of the above method steps.

With initial reference to FIGS. 1-3B, an example vehicle control system 100 includes a vehicle computer 110 that is programmed to obtain image data about an area 200 that includes a plurality of sub-areas 210. The vehicle computer 110 is further programmed to select one of the sub-areas 210 as a destination sub-area 210 based on sensor 115 data, e.g., image data, indicating that the destination sub-area 210 is unoccupied. The vehicle computer 110 is further programmed to then, upon detecting a candidate marker 215 for the destination sub-area 210, provide image data including the candidate marker 215 to a remote computer 140. The vehicle computer 110 is further programmed to operate a vehicle 105 to a stop in the destination sub-area 210. The vehicle computer 110 is further programmed to then, upon receiving a message from the remote computer 140 specifying an availability of the destination sub-area 210 based at least on the image data, one of (a) maintain the vehicle 105 in the destination sub-area 210 or (b) operate the vehicle 105 out of the destination sub-area 210.

The vehicle computer 110 operates the vehicle 105 along a planned path P (see FIG. 2A) in an area 200 that includes a plurality of sub-areas 210. While operating along the planned path P, the vehicle computer 110 can search for destination sub-areas 210, e.g., unoccupied parking spaces, via image data. However, a destination sub-area 210 may include one or more conditions restricting or prohibiting access to the destination sub-area 210, e.g., displayed on a sign associated with the destination sub-area 210, painted on a ground surface of the destination sub-area 210, etc. Advantageously, the vehicle computer 110 can transmit the image data including the candidate marker 215 and a request to specify the availability of the destination sub-area 210 to the remote computer 140, which can reduce the computational load on the vehicle computer 110 and can reduce the processing time to determine the availability of the destination sub-area 210. Additionally, upon requesting an availability of the destination sub-area 210 from a remote computer 140 based at least on image data including a candidate marker 215 associated with the destination sub-area 210, the vehicle computer 110 can actuate one or more vehicle components 125 to operate the vehicle 105 to a stop in the destination sub-area 210, which prevents the vehicle 105 from impeding traffic while the remote computer 140 determines the availability of the destination sub-area 210.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote computer 140 and/or a user device 145, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a pole, a sign, a curb, a bicycle, a tree, a shrub, etc., relative to the vehicle 105. As one example, the data may be image data of the environment around the vehicle 105. In such an example, the image data may include one or more objects in the area 200. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to other computers (typically via direct radio frequency communications). The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote computer 140, the user device 145, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

A remote computer 140 is a computer that is external to, and typically geographically remote from a vehicle 105. The remote computer 140 includes a second processor and a second memory such as are known. The second memory includes one or more forms of computer-readable media, and stores instructions executable by the second processor for performing various operations, including as described herein. For example, the remote computer 140 may be a cloud-based server. Further, the remote computer 140 can be accessed via the network 135, e.g., the Internet or some other wide area network.

The user device 145 can be a conventional computing device, i.e., including one or more processors and one or more memories, programmed to provide operations such as disclosed herein. The user device 145 can be a portable device. A portable device can be any one of a variety of computers that can be used while carried by a person, e.g., a smartphone, a tablet, a personal digital assistant, a smart watch, etc. The user device 145 receives data specified by a user, e.g., via a user interface. That is, a user inputs data to the user device 145. The data may indicate the availability of the destination sub-area 210 (as discussed below). Upon receiving data input from the user, the user device 145 can transmit the specified data to the remote computer 140, e.g., via the network 135.

Figure 2A:
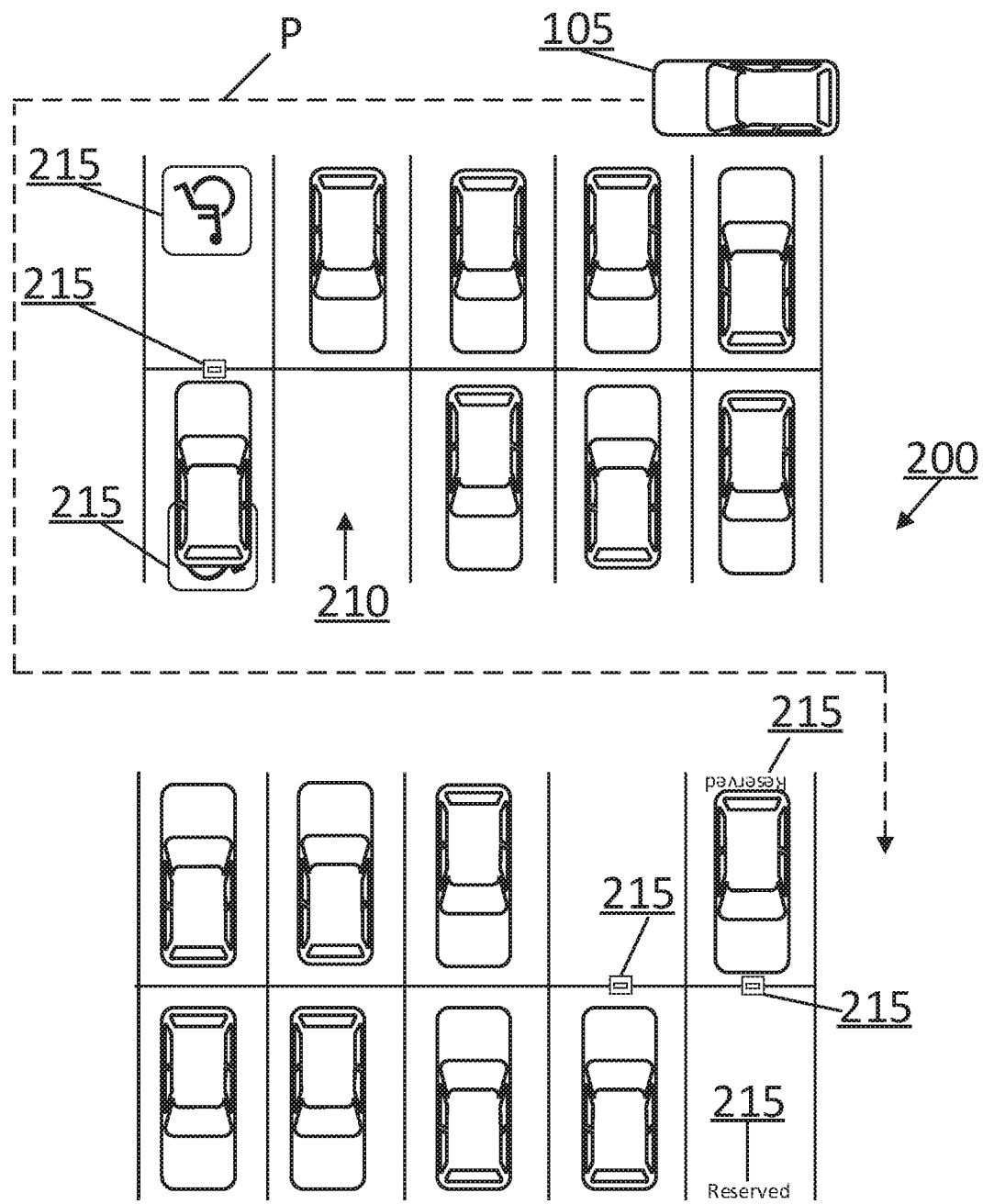
FIG. 2A is a diagram illustrating operating a vehicle in an area according to the system of FIG. 1.
Figure 2B:
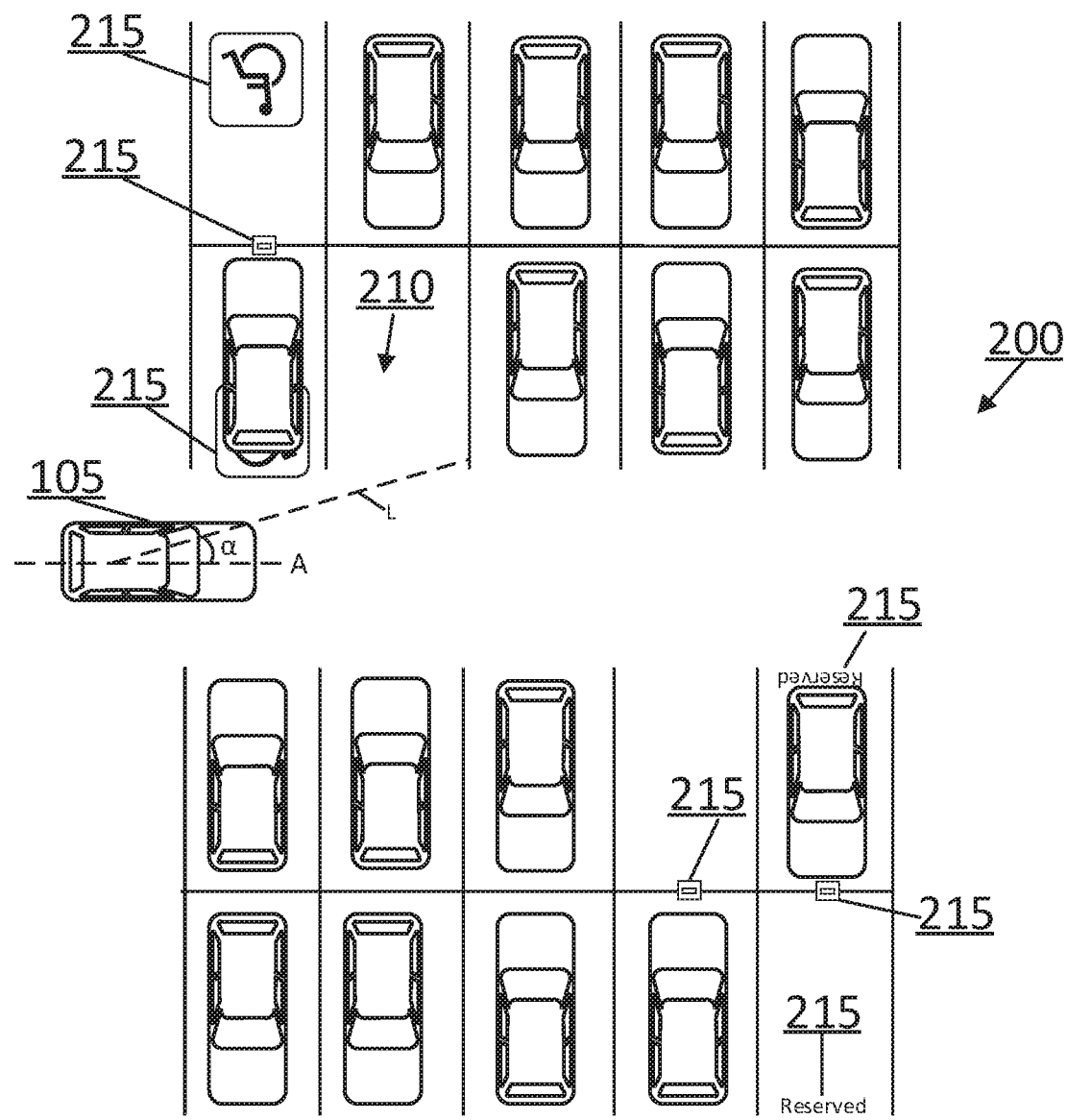
FIG. 2B is a diagram illustrating determining a location of a destination sub-area.
Figure 3A:
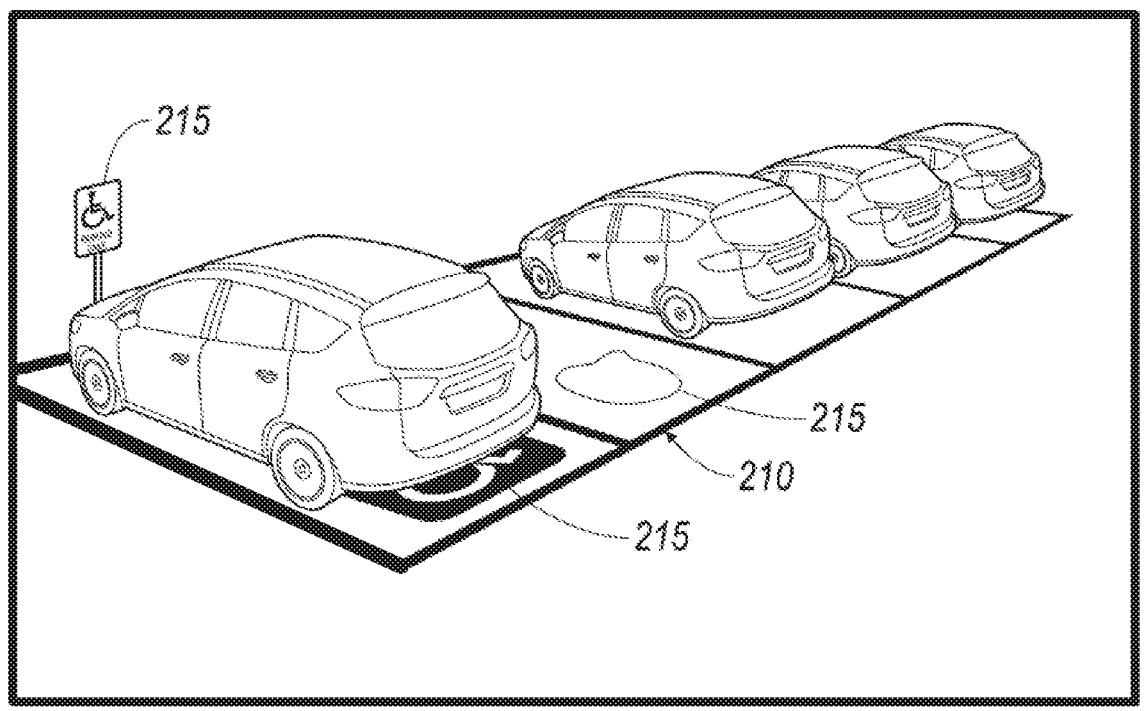
FIGS. 3A-3B are diagrams illustrating a candidate marker in a sub-area of the area.
Figure 3B:
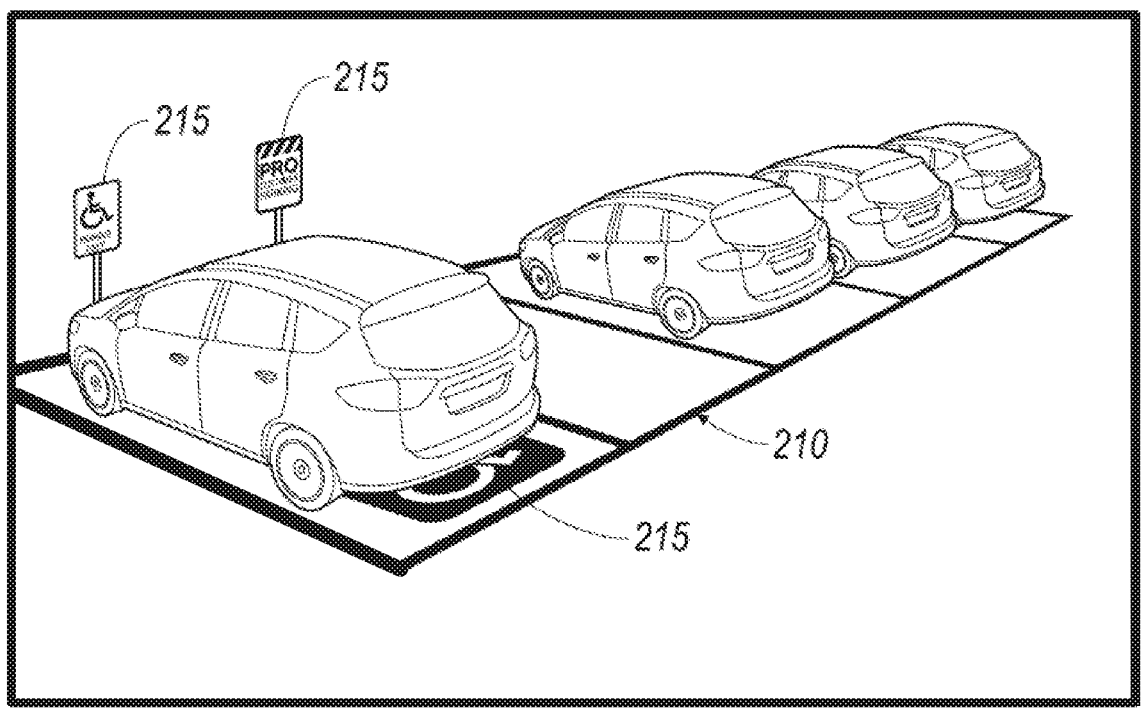

FIG. 2A is a diagram illustrating a vehicle 105 operating in an example ground surface area 200 that includes marked sub-areas 210 for vehicles. An area 200 may be on a street or road, e.g., alongside a curb or an edge of the street, a parking lot or structure or portion thereof, etc. The vehicle computer 110 may be programmed to determine the vehicle 105 is within the area 200 by, e.g., GPS-based geo-fencing. In such an example, the GPS geo-fence specifies a perimeter of the area 200. The vehicle computer 110 can then determine the vehicle 105 is within the area 200 based on the location data of the vehicle 105 indicating the vehicle 105 is within the geo-fence.

The vehicle computer 110 can, for example, generate a planned path P to operate the vehicle 105 in the area 200, e.g., based on a map of the area 200. As used herein, a "planned path" is a set of points, e.g., that can be specified as coordinates with respect to a vehicle coordinate system and/or geo-coordinates, that the vehicle computer 110 is programmed to determine with a conventional navigation and/or path planning algorithm. Alternatively, the remote computer 140 can generate the planned path P, e.g., based on a map of the area 200, and provide the planned path P to the vehicle computer 110, e.g., via the network 135. The map of the area 200 may be stored in a memory of the vehicle computer 110 and/or a second memory of the remote computer 140.

The planned plan P can, for example, direct the vehicle 105 along aisles or lanes along which sub-areas 210 are located in the area 200 to search for destination sub-areas 210 (see FIG. 2A). In such an example, the vehicle computer 110 is programmed to identify a sub-area 210 for parking the vehicle 105 based on image data received from camera sensors 115, e.g., via the vehicle network. For example, a sub-area 210 can be a parking space indicated by markings, e.g., painted lines on a ground surface, and image recognition techniques, such as are known, can be executed by the vehicle computer 110 to identify the destination sub-area 210.

Upon identifying a sub-area 210, the vehicle computer 110 can select the sub-area 210 as a destination sub-area 210 based on the destination sub-area 210 being unoccupied. That is, the vehicle computer 110 can determine no object is present in the destination sub-area 210, e.g., between markings of a parking space. For example, object classification or identification techniques, such as are known, can be used, e.g., in the vehicle computer 110 based on lidar sensor 115, camera sensor 115, etc., data, to identify a type of object, e.g., vehicle, person, bicycle, motorcycle, etc., as well as physical features of objects.

Various techniques such as are known may be used to interpret sensor 115 data. For example, camera and/or lidar image data can be provided to a classifier that comprises programming to utilize one or more conventional image classification techniques. For example, the classifier can use a machine learning technique in which data known to represent various objects is provided to a machine learning program for training the classifier. Once trained, the classifier can accept as input an image and then provide as output, for each of one or more respective regions of interest in the image, an identification of one or more objects or that no object is present in the respective region of interest. Further, a coordinate system (e.g., polar or cartesian) applied to an area proximate to a vehicle 105 can be applied to specify locations and/or areas (e.g., according to the vehicle 105 coordinate system, translated to global latitude and longitude geo-coordinates, etc.) of objects identified from sensor 115 data. Yet further, a computer 110 could employ various techniques for fusing (i.e., incorporating into a common coordinate system or frame of reference) data from different sensors 115 and/or types of sensors 115, e.g., lidar, radar, and/or optical camera data.

Upon selecting a destination sub-area 210, the vehicle computer 110 can be programmed to detect a candidate marker 215 for the destination sub-area 210. The vehicle computer 110 can, for example, analyze image data for the destination sub-area 210, e.g., using image or pattern recognition techniques, to detect the candidate marker 215 for the destination sub-area 210. A candidate marker 215 is a marking, e.g., letters, numbers, lines, shapes, symbols, etc., associated with the destination sub-area 210. The candidate marker 215 may, for example, be on a ground surface of the destination sub-area 210, e.g., between markings of a parking space (see FIG. 3A). As another example, the candidate marker 215 may be on a sign facing the destination sub-area 210, e.g., along a boundary of the destination sub-area 210 and/or above the ground surface of the destination sub-area 210 (see FIG. 3B).

Upon detecting the candidate marker 215 associated with the destination sub-area 210, the vehicle computer 110 transmits image data including the candidate marker 215 to the remote computer 140. Additionally, the vehicle computer 110 can transmit location data of the destination sub-area 210 to the remote computer 140, e.g., in a same or different transmission. The vehicle computer 110 can, for example, determine the location of the destination sub-area 210 based on the image data. For example, the vehicle computer 110 can identify an edge, e.g., a painted line on a ground surface, of the destination sub-area 210, e.g., according to image recognition techniques. The vehicle computer 110 can further determine an angle α between a line L from the camera sensor 115 lens to the identified edge of the destination sub-area 210 and an axis A extending from the lens parallel to a longitudinal axis of the vehicle 105. Then, the vehicle computer 110 can identify the destination sub-area 210 in the map of the area 200 based on determining the identified edge of the sub-area 210 in the map that is intersected by the line L extending from the location of the vehicle 105 and at the angle α relative to the axis A (See FIG. 2B) Upon identifying the destination sub-area 210 in the map, the location of the destination sub-area 210 may be determined.

The vehicle computer 110 can then, i.e., after identifying the destination sub-area 210 and determining its location, actuate one or more vehicle components 125 to operate the vehicle 105 to a stop in the destination sub-area 210. The vehicle 105 is at a stop when substantially all of the vehicle 105 is within a boundary of the destination sub-area 210, e.g., between markings of a parking space, and the vehicle 105 is stationary. The vehicle computer 110 can, for example, determine substantially all of the vehicle 105 is within the boundary of the destination sub-area 210 by comparing the location of the vehicle 105 to the location of the destination sub-area 210. As another example, the vehicle computer 110 can analyze sensor data 115 to determine the vehicle 105 is approximately centered laterally and longitudinally relative to the boundary of the destination sub-area 210. The vehicle computer 110 can determine the vehicle 105 is stationary based on sensor data 115, e.g., received from a wheel speed sensor 115 or the like.

Upon operating the vehicle 105 to the stop in the destination sub-area 210, the vehicle computer 110 can provide second image data to the remote computer 140. The second image data can capture a different field of view than the image data. For example, the camera sensors 115 can capture second image data including the candidate marker 215 (e.g., on a sign facing the destination sub-area 210 or on the ground surface between the boundary of the destination sub-area 210 and the wheels of the vehicle 105) when the vehicle 105 is stopped in the destination sub-area 210. The vehicle computer 110 can then transmit the second image data to the remote computer 140, e.g., via the network 135. Additionally, or alternatively, the vehicle computer 110 can provide location data of the vehicle 105 upon operating the vehicle 105 to the stop in the destination sub-area 210. In such an example, the remote computer 140 can determine the location of the destination sub-area 210 based on the location of the vehicle 105.

Upon receiving a message from the remote computer 140 specifying the availability of the destination sub-area 210, the vehicle computer 110 can actuate one or more vehicle components 125. Specifying the availability includes specifying whether the vehicle 105 is prohibited from accessing the destination sub-area 210, or not prohibited from accessing the destination sub-area 210. For example, based on the message specifying the destination sub-area 210 is available (i.e., the vehicle 105 is not prohibited from accessing the destination sub-area 210), the vehicle computer 110 can actuate one or more vehicle components 125 to maintain the vehicle 105 in the destination sub-area 210. Alternatively, based on the message specifying the destination sub-area 210 is unavailable (i.e., the vehicle 105 is prohibited from accessing the destination sub-area 210), the vehicle computer 110 can actuate one or more vehicle components 125 to move the vehicle 105 out of the destination sub-area 210. In this situation, upon departing the destination sub-area 210, the vehicle computer 110 can operate the vehicle 105 along the planned path P, e.g., to continue searching for a destination sub-area 210.

The vehicle computer 110 can be programmed to update a map of the area 200, e.g., stored in the memory of the vehicle computer 110. The map may specify the availability of each sub-area 210 within the area 200. For example, the vehicle computer 110 can update the availability of the destination sub-area 210 based on the message specifying the destination sub-area 210 is unavailable. That is, the vehicle computer 110 can update the map to specify the destination sub-area 210 is unavailable. The vehicle computer 110 can be programmed to reject, i.e., not select, sub-areas 210 as destination sub-areas 210 based on the sub-area 210 being unavailable in the map.

The remote computer 140 can be programmed to determine a verification of the candidate marker 215 included in the image data and/or the second image data. That is, the remote computer 140 can determine whether the candidate marker 215 is verified or unverified. The candidate marker 215 is verified when the remote computer 140 interprets the candidate marker 215 in the image data and/or the second image data. The candidate marker 215 is unverified when the remote computer 140 is unable to interpret the candidate marker 215 in the image data and/or the second image data.

The remote computer 140 can, for example, provide the image data and/or the second image data to a classifier that comprises programming to utilize one or more image classification techniques. The classifier can use a machine learning technique in which data known to represent various verified markers is provided to a machine learning program for training the classifier. Once trained, the classifier can accept as input one or more images and then provide as output an identification of one or more verified candidate markers 215, or that no verified candidate marker 215 is present in the image(s). In the case that the machine learning outputs that a verified candidate marker 215 is present in the image data and/or second image data, the remote computer 140 determines the candidate marker 215 is verified. In the case that the machine learning outputs that no verified candidate marker 215 is present in the image data or the second image data, the remote computer 140 determines the candidate marker 215 is unverified.

Upon determining the candidate marker 215 is verified, the remote computer 140 can be programmed to identity the verified candidate marker 215. That is, the remote computer 140 can determine the condition(s) (e.g., "No Parking", "No Event Parking", "Reserved", "Compact Car Only", "Handicapped Only", etc.) specified by the verified candidate marker 215, e.g., restricting or prohibiting access to the destination sub-area 210. For example, the remote computer 140 can input the image data and/or the second image data including the verified candidate marker 215 into a neural network, such as a deep neural network (DNN), that can be trained to accept image data and/or second image data including a verified candidate marker 215 as input and generate an output of an identification of the verified candidate marker 215, i.e., the condition specified by the verified candidate marker 215.

Additionally, the DNN can output a confidence estimate of the verified candidate marker 215 identification. The DNN can determine the output estimate based on comparing the image data including the verified candidate marker 215 to image data known to represent candidate markers 215, e.g., by using image processing techniques such as are known. A confidence estimate is a numerical value, e.g., a percentage, a number between 0 and 1, etc., that represents a similarity, e.g., a percentage of matching pixels, between the image data including the verified candidate marker 215 and image data known to represent the identified candidate marker 215. For example, the remote computer 140 can compare the confidence estimate to a predetermined threshold, e.g., 0.8. The predetermined threshold may be determined based on, e.g., empirical testing to determine a minimum confidence estimate below which the DNN incorrectly identifies verified candidate markers 215. In the case that the confidence estimate is equal to or greater than the predetermined threshold, the remote computer 140 determines the verified candidate marker 215 can be identified. In the case that the confidence estimate is less than the predetermined threshold, the remote computer 140 determines the verified candidate marker 215 cannot be identified.

Upon determining the verified candidate marker 215 is unidentified, the remote computer 140 can be programmed to transmit the image data and/or the second image data including the verified candidate marker 215 to the user device 145, e.g., via the network 135. Additionally, the remote computer 140 can transmit location data of the destination sub-area 210 to the user device 145, e.g., in a same or different message.

The remote computer 140 can format the image data and/or second image data based on the verified candidate marker 215 and/or the user device 145. For example, the remote computer 140 can crop the image data and/or second image data. The remote computer 140 can determine a minimal enclosure that includes the verified candidate marker 215 and a minimal amount of background. The remote computer 140 can then delete the section of the image data and/or second image data not enclosed by the minimal enclosure. The minimal amount of background may be determined based on, e.g., a user input, a function of the size, i.e., dimensions, of the verified candidate marker 215, etc. As another example, the minimal enclosure may be determined based on a size, i.e., dimensions, of a display screen of the user device 145. That is, the remote computer 140 can select a minimal enclosure that has the same dimensions as the user device 145 display screen. The remote computer 140 may store the dimensions of the user device 145 display screen, e.g., in the second memory. As another example, the remote computer 140 can receive the dimensions of the user device 145 display screen from the user device 145, e.g., via the network 135.

Additionally, or alternatively, the remote computer 140 can adjust a pixel resolution, i.e., a total number of count of pixels (e.g., 2560×1440 pixels), of the image data and/or second data based on the pixel resolution of the user device 145 display screen. The remote computer 140 can receive the user device 145 pixel resolution from the user device 145, e.g., in a same or different transmission as the dimensions of the user device 145 display screen.

The remote computer 140 is programmed to determine the availability of the destination sub-area 210 based on the image data and/or the second image data including the candidate marker 215. For example, upon identifying the verified candidate marker 215 via the image data and/or second image data, the remote computer 140 can compare vehicle 105 data, e.g., based on vehicle data, such as vehicle dimensions, a type of vehicle, a vehicle identifier, vehicle user characteristics, etc., to the prohibition condition(s) specified by the verified candidate marker 215 to determine whether the vehicle 105 is prohibited from accessing the destination sub-area 210 or is not prohibited from accessing the destination sub-area 210. The remote computer 140 can receive the vehicle 105 data from the vehicle computer 110, e.g., via the network 135. In the case that the vehicle 105 is prohibited from accessing the destination sub-area 210, the remote computer 140 determines the destination sub-area 210 is unavailable. In the case that the vehicle 105 is not prohibited from accessing the destination sub-area 210, the remote computer 140 determines the destination sub-area 210 is available. Additionally, the remote computer 140 can determine the destination sub-area 210 is available based on determining the candidate marker 215 is unverified.

Additionally, or alternatively, upon determining the verified candidate marker 215 is unidentified, the remote computer 140 can determine the availability of the destination sub-area 210 based on a validation message from the user device 145. As set forth above, the remote computer 140 can transmit image data and or second image data including the verified candidate marker 215 to the user device 145. The user device 145 can then display the image data and/or second image data including the verified candidate marker 215 to a user via the user device 145 display screen. Additionally, the user device 145 can request user input to specify a validation of the destination sub-area 210 based on the verified candidate marker 215. That is, the user device 145 requests the user specify the destination sub-area 210 is one of valid or invalid for the vehicle 105, e.g., at a present time, based on the verified candidate marker 215. Upon receiving the user input, the user device transmits a validation message specifying the validation of the destination sub-area 210 to the remote computer 140.

The remote computer 140 can, for example, initiate a timer upon providing the image data and/or second image data to the user device 145. The remote computer 140 determines the destination sub-area 210 is available based on passage of a predetermined time, e.g., expiration of the timer, without receiving the validation message from the user device. Conversely, upon receiving the validation message within the predetermined time, i.e., prior to expiration of the timer, the remote computer 140 can determine the availability of the destination sub-area 210 based on the validation message. The predetermined time may be determined based on e.g., empirical testing to determine an average amount of time for users to check their user devices 145 upon receiving a message. In the case that the validation message indicates the destination sub-area 210 is valid, the remote computer 140 determines the destination sub-area 210 is available. In the case that the validation message indicates the destination sub-area 210 is invalid, the remote computer 140 determines the destination sub-area 210 is unavailable. The remote computer 140 can then transmit the message specifying the availability of the destination sub-area 210 to the vehicle computer 110, e.g., via the network 135.

The remote computer 140 may be programmed to update a map of the area 200, e.g., stored in the second memory, based on crowdsourced data. Crowdsourced data means having a plurality of user devices 145 provide validation messages independently of one another and then combining (e.g., by averaging and/or using some other statistical measure) the results. That is, the remote computer 140 may be programmed to receive validation messages from a plurality of user devices 145 indicating the destination sub-area 210 is unavailable based on vehicle data of a plurality of vehicles and/or a time that respective vehicle computers select the destination sub-area 210. Based on the crowdsourced data indicating the destination sub-area 210 is unavailable (e.g., an average number of messages, a percentage of messages, etc., indicating the destination sub-area 210 is unavailable being above a threshold), the remote computer 140 can update the map to specify the destination sub-area 210 is unavailable based on the vehicle data and/or a time. The remote computer 140 can then transmit the map to a plurality of vehicles, including the vehicle 105, e.g., via the network 135.

Figure 4:
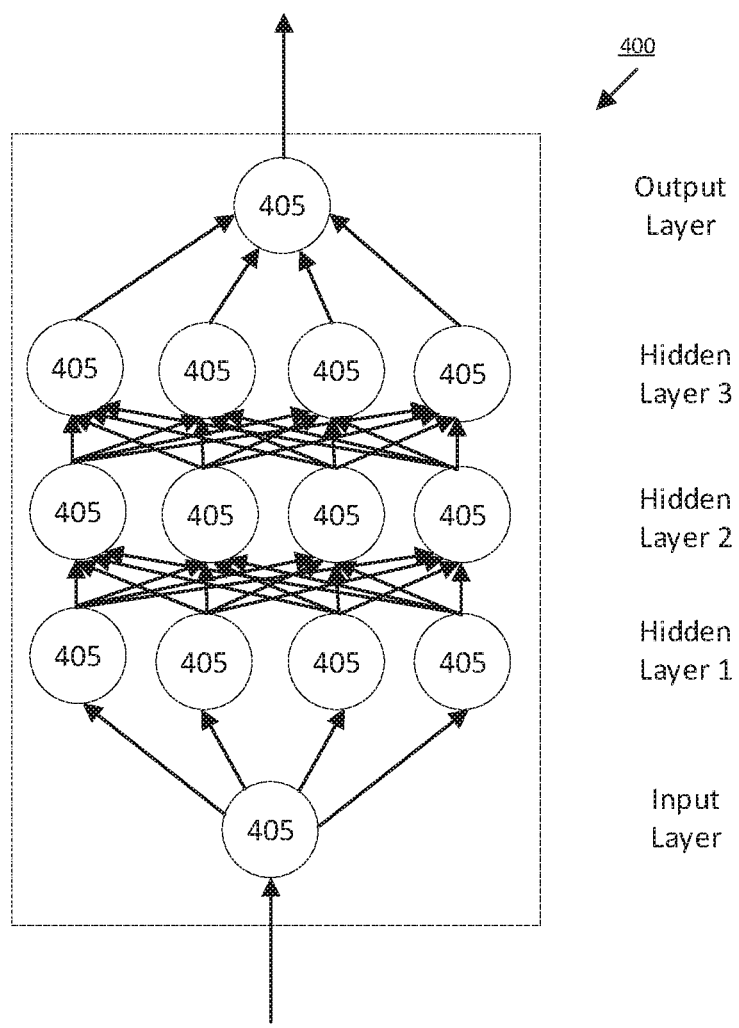
FIG. 4 is an example diagram of a deep neural network.

FIG. 4 is a diagram of an example deep neural network (DNN) 400 that can be trained to identify a verified candidate marker 215 based on image data including the verified candidate marker 215. The DNN 400 can be a software program that can be loaded in memory and executed by a processor included in a computer, for example. In an example implementation, the DNN 400 can include, but is not limited to, a convolutional neural network (CNN), R-CNN (Region-based CNN), Fast R-CNN, and Faster R-CNN. The DNN includes multiple nodes, and the nodes are arranged so that the DNN 400 includes an input layer, one or more hidden layers, and an output layer. Each layer of the DNN 400 can include a plurality of nodes 405. While FIG. 4 illustrate three (3) hidden layers, it is understood that the DNN 400 can include additional or fewer hidden layers. The input and output layers may also include more than one (1) node 405.

The nodes 405 are sometimes referred to as artificial neurons 405, because they are designed to emulate biological, e.g., human, neurons. A set of inputs (represented by the arrows) to each neuron 405 are each multiplied by respective weights. The weighted inputs can then be summed in an input function to provide, possibly adjusted by a bias, a net input. The net input can then be provided to an activation function, which in turn provides a connected neuron 405 an output. The activation function can be a variety of suitable functions, typically selected based on empirical analysis. As illustrated by the arrows in FIG. 4, neuron 405 outputs can then be provided for inclusion in a set of inputs to one or more neurons 405 in a next layer.

As one example, the DNN 400 can be trained with ground truth data, i.e., data about a real-world condition or state. For example, the DNN 400 can be trained with ground truth data and/or updated with additional data by a processor of the remote computer 140. Weights can be initialized by using a Gaussian distribution, for example, and a bias for each node 405 can be set to zero. Training the DNN 400 can include updating weights and biases via suitable techniques such as back-propagation with optimizations. Ground truth data can include, but is not limited to, data specifying objects, e.g., vehicles, signs, pedestrians, debris, etc., within an image or data specifying a physical parameter. For example, the ground truth data may be data representing objects and object labels. In another example, the ground truth data may be data representing an object, e.g., a vehicle 105, and a relative angle and/or speed of the object, e.g., the vehicle 105, with respect to another object, e.g., a pedestrian, another vehicle, a sign etc.

Additionally, or alternatively, the DNN 400 can be trained based on validation messages from a plurality of user device 145 indicating the destination sub-area 210 is unavailable within the predetermine time. For example, the remote computer 140 can combine the results (e.g., by averaging and/or using some other statistical measure) of validation messages from a plurality of user device 145 indicating the destination sub-area 210 is unavailable within the predetermine time. Based on, e.g., an average, a percentage, etc., of the validation messages indicating the destination sub-area 210 is unavailable, the remote computer 140 can provide data to train the DNN 400, as set forth above. The data specifies the verified candidate marker 215 and the destination sub-area 210 is unavailable.

During operation, the remote computer 140 verifies the candidate marker 215 and provides image data and/or second image data including the verified candidate marker 215 for the destination sub-area 210 to the DNN 400. The DNN 400 generates a prediction based on the received input. The output is an identification of the verified candidate marker 215, i.e., the condition(s) specified by the verified candidate marker 215, and a confidence estimate (as discussed above). The DNN 400 can, for example, be programmed to identify the verified candidate marker 215 based on optical character recognition (OCR). OCR is a machine vision technique that determines whether image data corresponding to alphanumeric characters are present in an image and if so, which alphanumeric characters are present. OCR can operate by performing matched filters corresponding to font, style, size, and orientation of alphanumeric characters to determine a digital character and location. Additionally, the DNN 400 can be programmed to then input the characters into a Natural Language Processing (NLP) system trained to output an identification of the verified candidate marker 215 in a natural language according to the characters present in the image. Further, the NLP can be trained to translate the identified characters from one language to another language, e.g., specified by a user. As another example, the DNN 400 can be programmed to identify the verified candidate marker 215 based on pattern recognition techniques.

Figure 5:
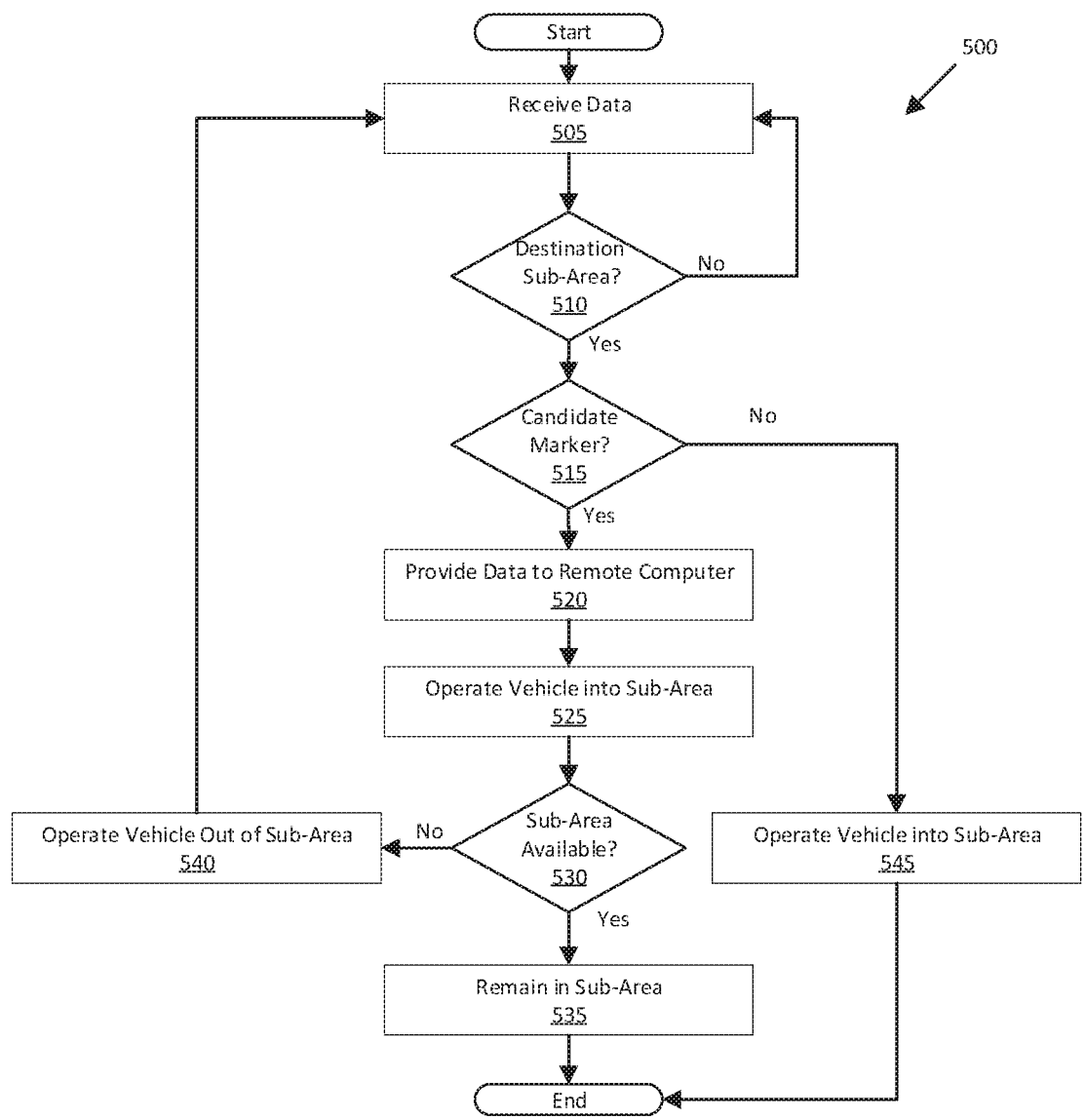
FIG. 5 is a flowchart of an example process for operating the vehicle.

FIG. 5 is a diagram of an example process 500 for operating a vehicle 105 in an area 200. The process 500 begins in a block 505.

In the block 505, the vehicle computer 110 receives sensor 115 data, e.g., image data, from one or more sensors 115, e.g., via the vehicle network, while the vehicle 105 is operating in the area 200 (e.g., to search for a sub-area 210 such as a parking space). The image data includes the environment around the vehicle 105, e.g., the area 200, one or more sub-areas 210, one or more objects, etc. The process 500 continues in a block 510.

In the block 510, the vehicle computer 110 selects a sub-area 210 as a destination sub-area 210. For example, the vehicle computer 110 can identify the sub-area 210 using image recognition techniques, as discussed above. Upon identifying the sub-area 210, the vehicle computer 110 selects the sub-area 210 as a destination sub-area 210 based on sensor 115 data, e.g., image data, indicating that the destination sub-area 210 is unoccupied. The vehicle computer 110 can determine that the destination sub-area 210 is unoccupied using object classification techniques, as discussed above. If the vehicle computer 110 selects the sub-area 210 as the destination sub-area 210, then the process 500 continues in a block 515. Otherwise, the process 500 returns to the block 505.

In the block 515, the vehicle computer 110 detects a candidate marker 215 for the destination sub-area 210 based on the image data for the destination sub-area 210. As set forth above, a candidate marker 215 is a marking associated with the destination sub-area 210. For example, the vehicle computer 110 can analyze the image data using image or pattern recognition techniques, as discussed above, to detect a candidate marker 215 for the destination sub-area 210. The candidate marker 215 may, for example, be included on a sign facing the destination sub-area 210 and/or on a ground surface of the destination sub-area 210. If the vehicle computer 110 detects a candidate maker 215 for the destination sub-area 210, then the process 500 continues in a block 520. Otherwise, the process 500 continues in a block 545.

In the block 520, the vehicle computer 110 provides image data including the candidate marker 215 to a remote computer 140. For example, the vehicle computer 110 can transmit the image data to the remote computer 140 via the network 135. Additionally, the vehicle computer 110 can provide location data of the destination sub-area 210 to the remote computer 140, e.g., in a same or different message. The vehicle computer 110 can determine a location of the destination sub-area 210 by determining a location of the destination sub-area 210 relative to a location of the vehicle 105 via image data. The vehicle computer 110 can then identify a sub-area 210 in a map of the area 210 as the destination sub area based on the location of the vehicle 105 and the location of the destination sub-area 210 relative to the vehicle 105, as discussed above. The vehicle computer 110 can then determine the location of the destination sub-area 210 based on the identified sub-area 210 in the map. The process 500 continues in a block 525.

In the block 525, the vehicle computer 110 operates the vehicle 105 to a stop in the destination sub-area 210. For example, the vehicle computer 110 can actuate one or more vehicle components 125 to move the vehicle 105 into the destination sub-area 210. Upon determining that substantially all of the vehicle 105 is in the destination sub-area 210 based on sensor 115 data, as discussed above, the vehicle computer 110 can actuate one or more vehicle components 125 to stop the vehicle 105.

Additionally or alternatively, the vehicle computer 110 can then obtain second image data, e.g., from one or more sensors 115, including the candidate marker 215. The vehicle computer 110 can provide the second image data to the remote computer 140. Additionally or alternatively, the vehicle computer 110 can provide a location of the vehicle 105 to the remote computer 140 upon operating the vehicle 105 to a stop in the destination sub-area 210. In such an example, the remote computer 140 can determine the location of the destination sub-area 210 based on the location of the vehicle 105. The process 500 continues in a block 530.

In the block 530, the vehicle computer 110 receives a message, e.g., via the network 135, from the remote computer 140 specifying the availability of the destination sub-area 210. As set forth above, specifying the availability includes specifying whether the vehicle 105 is prohibited from accessing the destination sub-area 210, or not prohibited from accessing the destination sub-area 210. In the case that the message specifies the destination sub-area 210 is available, the process 500 continues in a block 535. Otherwise, the process 500 continues in a block 540.

In the block 535, the vehicle computer 110 maintains the vehicle 105 in the destination sub-area 210. For example, the vehicle computer 110 can actuate one or more vehicle components 125, e.g., a transmission to engage in a park gear and/or an ignition to engage in an off state, to keep the vehicle 105 in the destination sub-area 210. The process 500 ends following the block 535.

In the block 540, which can follow the block 530, the vehicle computer 110 operates the vehicle 105 out of the destination sub-area 210. For example, the vehicle computer 110 can actuate one or more vehicle components 125 to move the vehicle 105 out of the destination sub-area 210, e.g., backwards along a path into the destination sub-area 210. The vehicle computer 110 can then operate the vehicle 105 along the planned path P. For example, the vehicle computer 110 can actuate one or more vehicle components 125 to move the vehicle 105 through the area 200, e.g., to continue searching for destination sub-areas 210. Additionally, the vehicle computer 110 can update a map, e.g., stored in a memory of the vehicle computer 110, to specify the destination sub-area 210 is unavailable for the vehicle 105, e.g., based on vehicle data of the vehicle 105 and/or a present time. The process 500 returns to the block 505.

In the block 545, which can follow the block 515, discussed above, the vehicle computer 110 operates the vehicle 105 into the destination sub-area 210. For example, the vehicle computer 110 can actuate one or more vehicle components 125 to move the vehicle 105 into the destination sub-area 210. Upon determining that substantially all of the vehicle 105 is in the destination sub-area 210 based on sensor 115 data, as discussed above, the vehicle computer 110 can actuate one or more vehicle components 125 to stop the vehicle 105. Additionally, the vehicle computer 110 can actuate one or more vehicle components 125, e.g., a transmission to engage in a park gear and/or an ignition to engage in an off state, to maintain the vehicle 105 in the destination sub-area 210. The process 500 ends following the block 545.

Figure 6:
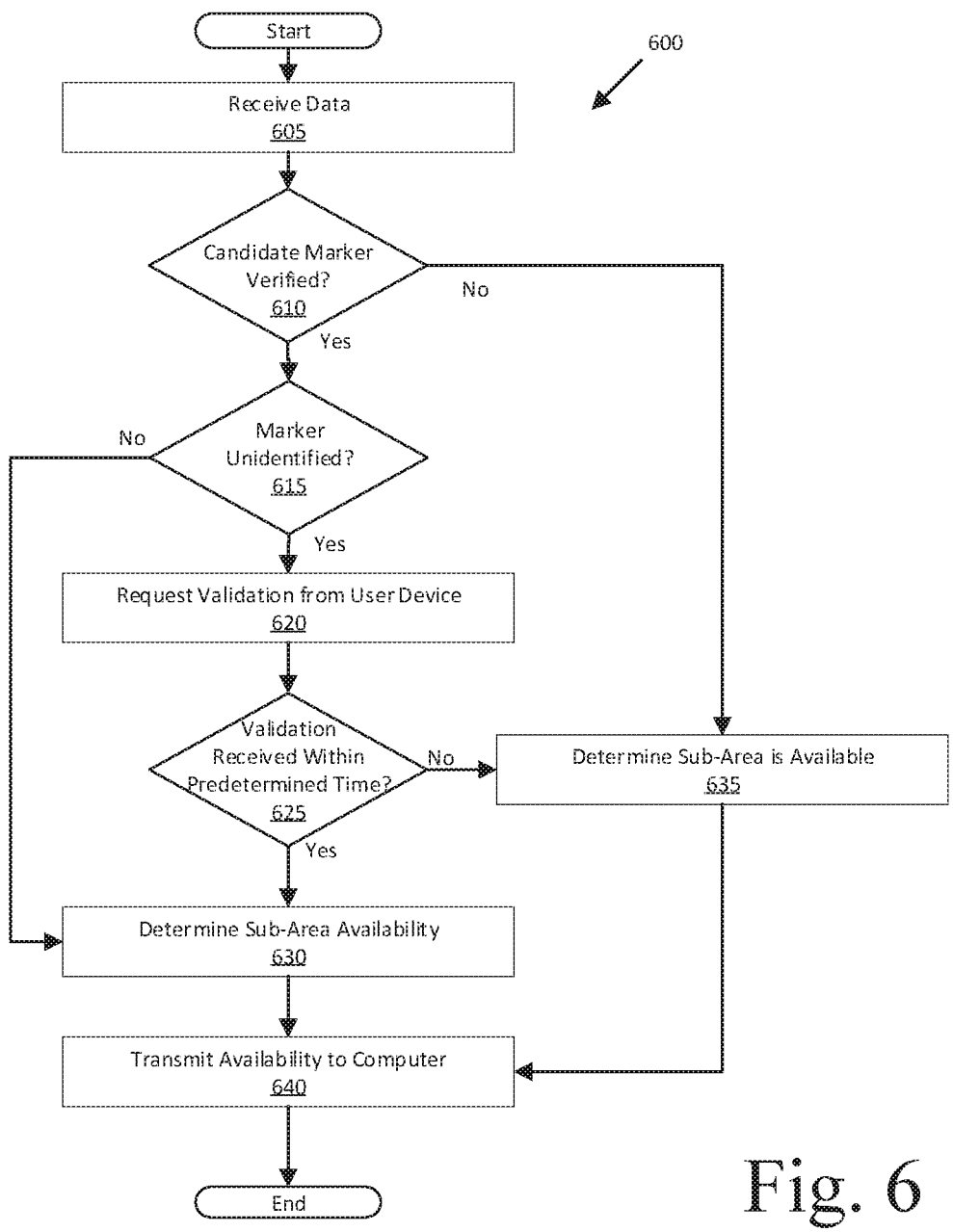
FIG. 6 is a flowchart of an example process for determining an availability of a destination sub-area.

FIG. 6 is a diagram of an example process 600 for determining an availability of a destination sub-area 210. The process 600 begins in a block 605.

In the block 605, a remote computer 140 receives data from a vehicle computer 110, e.g., via a network 135. The data is image data including a candidate marker 215 for a destination sub-area 210. Additionally, the remote computer 140 can receive second image data from the vehicle computer 110. The second image data provides a different field of view than the image data. For example, the vehicle computer 110 can provide the image data prior to operating the vehicle 105 into the destination sub-area 210 and can provide the second image data upon stopping the vehicle 105 in the destination sub-area 210. Further, the remote computer 140 can receive a location of the destination sub-area 210 from the vehicle computer 110, as discussed above. The process 600 continues in a block 610.

In the block 610, the remote computer 140 determines a verification of the candidate marker 215 based on the image data and/or the second image data. The remote computer 140 determines that the candidate marker 215 is verified when the remote computer 140 interprets the candidate marker 215 in the image data and/or the second image data. The remote computer 140 determines that the candidate marker 215 is unverified when the remote computer 140 is unable to interpret the candidate marker 215 in the image data and/or the second image data.

For example, the remote computer 140 can include a classifier, such as discussed above, that can be trained to accept as input one or more images and then provide as output an indication of one or more verified candidate markers 215 or an indication that no verified candidate marker 215 is present in the image(s). In the case that the classifier outputs that a verified candidate marker 215 is present in the image data and/or second image data, the remote computer 140 determines the candidate marker 215 is verified. In the case that the classifier outputs that no verified candidate marker 215 is present in the image data or the second image data, the remote computer 140 determines the candidate marker 215 is unverified. If the candidate marker 215 is verified, the process 600 continues in a block 615. Otherwise, the process 600 continues in a block 635.

In the block 615, the remote computer 140 determines whether the verified candidate marker 215 is unidentified. For example, the remote computer 140 can include a neural network, such as discussed above, that can be trained to accept image data and/or second image data including a verified candidate marker 215 as input and generate an output of an identification of the verified candidate marker 215, i.e., the condition specified by the verified candidate marker 215 prohibiting or restricting access to the destination sub-area 210.

Additionally, the DNN can output a confidence estimate, as discussed above, of the verified candidate marker 215 identification. The remote computer 140 can then compare the confidence estimate to a predetermined threshold. In the case that the confidence estimate is equal to or greater than the predetermined threshold, the remote computer 140 determines the verified candidate marker 215 can be identified. In the case that the confidence estimate is less than the predetermined threshold, the remote computer 140 determines the verified candidate marker 215 cannot be identified. If the verified candidate marker 215 is unidentified, the process continues in a block 620. Otherwise, the process 600 continues in a block 630.

In the block 620, the remote computer 140 provides image data including the verified candidate marker 215 to a user device 145, e.g., via the network 135. The remote computer 140 can format the image data based on the user device 145 and/or the verified candidate marker 215, as discussed above. The user device 145 can display the image data including the verified candidate marker 215 to a user, as discussed above. Additionally, the user device 145 can request a user input indicating the availability of the destination sub-area 210. For example, the user input can specify that the destination sub-area 210 is one of valid or invalid for the vehicle 105, e.g., at a present time, based on the verified candidate marker 215. The user device 145 can transmit a validation message to the remote computer 140 upon receiving the user input. The process 600 continues in a block 625.

In the block 625, the remote computer 140 determines whether a validation message is received from the user device within a predetermined time. For example, the remote computer 140 can initiate a timer upon transmitting the image data to the user device 145. In the case that the validation message is received after the passage of the predetermined time, e.g., after expiration of the timer, the process 600 continues in the block 635. Otherwise, the process 600 continues in the block 630.

In the block 630, the remote computer 140 determines the availability of the destination sub-area 210. For example, upon determining the verified candidate marker 215 can be identified, the remote computer 140 can compare vehicle 105 data, e.g., based on vehicle data, such as vehicle dimensions, a type of vehicle, a vehicle identifier, vehicle user characteristics, etc., to the prohibition condition(s) specified by the verified candidate marker 215 to determine whether the vehicle 105 is prohibited from accessing the destination sub-area 210, or is not prohibited from accessing the destination sub-area 210. The remote computer 140 can receive the vehicle 105 data from the vehicle computer 110, e.g., via the network 135. In the case that the vehicle 105 is prohibited from accessing the destination sub-area 210, the remote computer 140 determines the destination sub-area 210 is unavailable for the vehicle 105, e.g., at the present time. In the case that the vehicle 105 is not prohibited from accessing the destination sub-area 210, the remote computer 140 determines the destination sub-area 210 is available for the vehicle 105, e.g., at the present time.

Alternatively, upon determining the verified candidate marker 215 cannot be identified, the remote computer 140 can determine the availability of the destination sub-area 210 based on the validation message. In the case that the validation message specifies the destination sub-area 210 is valid for the vehicle 105 at a present time, the remote computer 140 determines the destination sub-area 210 is available for the vehicle 105 at the present time. In the case that the validation message specifies the destination sub-area 210 is invalid for the vehicle 105 at the present time, the remote computer 140 determines the destination sub-area 210 is unavailable for the vehicle 105 at the present time. The process 600 continues in a block 640.

In the block 635, the remote computer 140 determines the destination sub-area 210 is available for the vehicle 105. For example, the remote computer 140 determines the destination sub-area 210 is available for the vehicle 105 based on determining the candidate marker 215 is unverified in block 610. As another example, the remote computer 140 determines the destination sub-area 210 is available for the vehicle 105, e.g., at the present time, based on a passage of the predetermined time without receiving the validation message from the user device 145. The process 600 continues in the block 640.

In the block 640, the remote computer 140 transmits a message specifying the availability of the destination sub-area 210 to the vehicle computer 110, e.g., via the network 135. Additionally, based on crowdsourced data indicating the destination sub-area 210 is unavailable, e.g., based on vehicle data of a plurality of vehicles and/or a time that respective vehicle computers select the destination sub-area 210, (as discussed above), the remote computer 140 can update a map, e.g., stored in a second memory of the remote computer 140, to specify the destination sub-area 210 is unavailable based on the vehicle data and/or a time. The remote computer 140 can then transmit the map to a plurality of vehicles, e.g., via the network 135. The process 600 ends following the block 640.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix® operating system (e.g., the Solaris® operating system distributed by Oracle® Corporation of Redwood Shores, Calif.), the AIX UNIX operating system distributed by International Business Machines of Armonk, N.Y., the Linux® operating system, the Mac OSX and iOS operating systems distributed by Apple® Inc. of Cupertino, Calif., the BlackBerry® OS distributed by Blackberry, Ltd. of Waterloo, Canada, and the Android® operating system developed by Google®, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab®, Simulink®, Stateflow®, Visual Basic®, Java Script®, Perl®, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. The adjectives "first" and "second" are used throughout this document as identifiers and are not intended to signify importance or order. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising;
   a computer in a vehicle; and
   a remote computer in communication with the computer;
   wherein the computer includes a processor and a memory, the memory storing instructions executable by the processor to:
   obtain image data about an area that includes a plurality of sub-areas;
   select one of the sub-areas as a destination sub-area based on the destination sub-area being unoccupied;
   then, upon detecting a candidate marker for the destination sub-area via the image data, provide the image data including the candidate marker to the remote computer;
   operate the vehicle to a stop in the destination sub-area; and
   then, upon receiving a message from the remote computer specifying an availability of the destination sub-area based on at least the image data, one of (a) maintain the vehicle in the destination sub-area or (b) operate the vehicle out of the destination sub-area based on the message;
   wherein the remote computer includes a second processor and a second memory, the second memory storing instructions executable by the second processor to:
   determine a verification of the candidate marker based on an ability or inability to interpret the candidate marker in the image data;
   upon determining the candidate marker is verified, at least one of: identify the candidate marker or determine the candidate marker is unidentified; and
   then determine the availability of the destination sub-area based on one of the candidate marker being identified or a validation message from a user device.

2. The system of claim 1, wherein the instructions further include instructions to provide location data of the destination sub-area to the remote computer.

3. The system of claim 1, wherein the instructions further include instructions to, upon operating the vehicle to the stop, provide second image data including the candidate marker to the remote computer, wherein the message specifies the availability of the destination sub-area based further on the second image data.

4. The system of claim 1, wherein the instructions further include instructions to update the availability of the destination sub-area in a map based on the message from the remote computer specifying the destination sub-area is unavailable.

5. The system of claim 1, wherein the instructions further include instructions to, upon determining the candidate marker is unidentified, provide the image data including the candidate marker to the user device.

6. The system of claim 5, wherein the instructions further include instructions to crop the image data based on the candidate marker and a display of the user device.

7. The system of claim 1, wherein the instructions further include instructions to determine the sub-area is available based on determining the candidate marker is unverified.

8. The system of claim 1, wherein the instructions further include instructions to provide location data of the sub-area to the user device.

9. The system of claim 1, wherein the instructions further include instructions to determine the destination sub-area is available based on passage of a predetermined time without receiving the validation message from the user device.

10. The system of claim 1, wherein the instructions further include instructions to input image data indicating the candidate marker into a machine learning program and to obtain the verification of the candidate marker as output from the machine learning program.

11. The system of claim 10, wherein the instructions further include instructions to obtain an identification of the candidate marker and a confidence estimate as output from the machine learning program.

12. The system of claim 11, wherein the instructions further include instructions to determine the candidate marker is unidentified based on the confidence estimate being below a threshold.

13. The system of claim 10, wherein the instructions further include instructions to train the machine learning program based on messages from a plurality of user devices indicating the destination sub-area is unavailable within a predetermined time.

14. The system of claim 1, wherein the instructions further include instructions to update the availability of the sub-area in a map based on crowdsourced data including messages from a plurality of user devices indicating the destination sub-area is unavailable.

15. A method comprising,
   obtaining, via a computer, image data about an area that includes a plurality of sub-areas;
   selecting one of the sub-areas as a destination sub-area based on the destination sub-area being unoccupied;
   then, upon detecting a candidate marker for the destination sub-area via the image data, providing the image data including the candidate marker to a remote computer;
   operating a vehicle to a stop in the destination sub-area; and
   then, upon receiving a message from the remote computer specifying an availability of the destination sub-area based on at least the image data, one of (a) maintaining the vehicle in the destination sub-area or (b) operating the vehicle out of the destination sub-area based on the message;

determining, via the remote computer, a verification of the candidate marker based on an ability or inability to interpret the candidate marker in the image data;

upon determining the candidate marker is verified, at least one of: identifying the candidate marker or determining the candidate marker is unidentified; and then determining the availability of the destination sub-area based on one of the candidate marker being identified or a validation message from a user device.

16. The method of claim 15, further comprising providing location data of the destination sub-area to the remote computer.

17. The method of claim 15, further comprising determining the sub-area is available based on determining the identified candidate marker is unverified.

18. The method of claim 15, further comprising determining the destination sub-area is available based on passage of a predetermined time without receiving the validation message from the user device.

* * * * *